United States Patent [19]

Matsunaga et al.

[11] Patent Number: 5,601,344
[45] Date of Patent: Feb. 11, 1997

[54] FLUID PRESSURE CONTROL DEVICE FOR ANTISKID BRAKE SYSTEM

[75] Inventors: Kunihiro Matsunaga; Hiromi Ando, both of Yamanashi-ken, Japan

[73] Assignee: Tokico Ltd., Kanagawa-ken, Japan

[21] Appl. No.: 540,566

[22] Filed: Oct. 6, 1995

Related U.S. Application Data

[63] Continuation-in-part of Ser. No. 214,092, Mar. 16, 1994, abandoned, which is a continuation of Ser. No. 893,680, Jun. 5, 1992, abandoned.

[30] Foreign Application Priority Data

Jun. 18, 1991 [JP] Japan ................................. 3-146327

[51] Int. Cl.⁶ ..................................................... B60T 8/36
[52] U.S. Cl. ..................................... 303/115.4; 303/116.2
[58] Field of Search ........................... 303/119.1, 119.2, 303/115.4, 116.1, 116.2, DIG. 3, DIG. 4, 117.1

[56] References Cited

U.S. PATENT DOCUMENTS

| | | | |
|---|---|---|---|
| 3,865,440 | 2/1975 | Ostwald | 303/115.4 |
| 4,436,348 | 3/1984 | Farr | 303/115.4 |
| 4,844,558 | 7/1989 | Ishii et al. | 363/116.1 |

FOREIGN PATENT DOCUMENTS 2026248  1/1980  United Kingdom ................ 303/119.2

*Primary Examiner*—Matthew C. Graham
*Attorney, Agent, or Firm*—Biebel & French

[57] ABSTRACT

A brake fluid pressure adjustment device is presented for controlling the wheel lock of a vehicle by controlling the flow of the brake fluid from the main fluid path to the bypass path by means of a pumping mechanism which is in constant operation. The pumping mechanism includes a suction valve which only allows a unidirectional flow of brake fluid from the pump, and a reservoir to the pump; an electromagnetic device which forces open the bypass path between the pump and the reservoir by attracting the bypass path control valve element in one direction; and a discharge valve which allows only the flow of brake fluid from the pump to the main fluid path. Therefore, by controlling the actions of the electromagnetic means, it is possible to control the decrease, holding and increase actions of the pressure adjustment device, without stopping and starting the pump. The device thereby provides a delicate and timely response to the brake pressure variation needs without being affected by the inertial effects of the pump.

5 Claims, 2 Drawing Sheets

FLUID PRESSURE CONTROL DEVICE FOR ANTISKID BRAKE SYSTEM

RELATED APPLICATION

This is a Continuation-in-part of application Ser. No. 08/214,092, filed Mar. 16, 1994, now abandoned, which is a Continuation of application Ser. No. 07/893,680, filed Jun. 5, 1992, now abandoned.

BACKGROUND OF THE INVENTION

This invention is related to a pressure control device employed in antiskid brake control devices for automotive vehicles.

Of the various antiskid devices, an example of an unitized magnetic valve type aimed at reducing the manufacturing cost, is disclosed in JPA, First Publication, S59-32548. This device, as shown in FIG. 2, includes: a main fluid path 83, for transmitting the brake liquid pressure, disposed between a master cylinder 81 and a wheel cylinder 82; and a bypass path 84 branching from the main path. In the bypass path 84, there are normally closed (n/c) electro-magnetic valve 85 which open on reducing brake pressure, and allows the brake fluid in the main path 83 to enter the bypass path 84; and a reservoir 86 for storing the brake fluid which flows in through the n/c electro-magnetic valve 85; and a pumping device 87 which returns the brake fluid in the reservoir 86 to the main path 83 while keeping the n/c electro-magnetic valve 85 closed, which is disposed to the opposite side of the reservoir 86. There is a normally open (n/o) valve 88, disposed between the master cylinder 81 and the junction of the main path 83 and the master cylinder 81 side of the bypass path 84, which closes when the fluid flows into the bypass path 84. The pumping device 87 includes: a pump 89 which pumps and discharges the fluid; a one-way suction valve 90 which is disposed between the reservoir 86 and the pump 89, and allows the fluid flow from the reservoir 86 only; and a one-way discharge valve 91 which is disposed between the pump 89 and the main path 83, and allows the fluid flow to the main path 83.

During the operation of the antiskid control device, the device performs appropriate alternating operations of reducing the fluid pressure to the wheel cylinder 82 and increasing the fluid pressure to the main path 83: by opening the n/c electro-magnetic valve 85 and permitting the fluid in the main path 83 to flow into the bypass path 84 and, at the same time, closing the n/o valve 88 disposed on the master cylinder 81 side, so as to perform the fluid pressure reduction operation to the wheel cylinder 82 (the pump 89 is non-active at this time); and by closing the n/c electro-magnetic valve 85 in the bypass path 84, and at the same time, activating the pump 89 to pump the fluid from the reservoir 86 through the one-way valve 90 and discharges the fluid into the main path 83, through the one-way discharge valve 91 so as to perform the fluid pressure increase operation. To perform such a cyclic operations delicately, it is possible to resort to a pressure holding action preventing the pressure from rising by temporarily stopping the operation of the pump 89 during the pressure increase phase.

However, in a brake pressure adjustment device of such a construction, there is a time delay in the control action of the pump to generate decreasing, holding and increasing phases of the fluid pressure, because of the inertial effects associated with the mass of the pump.

SUMMARY OF THE INVENTION

A brake fluid pressure adjustment device is presented which comprises: a main fluid path which communicates a wheel cylinder and a master cylinder, and a bypass path branching from said main fluid path;

said bypass path is provided with
(a) a normally closed (n/c) magnetic valve which opens when the brake fluid pressure in said wheel cylinder is to be forcibly lowered, and thereby permitting the brake fluid to flow into said bypass path;
(b) a reservoir for storing the brake fluid flowing through said n/c magnetic valve; and
(c) a pumping mechanism which returns the brake fluid in said reservoir back to said main fluid path; and on the master cylinder side of the main fluid path away from the bypass path,
(d) a normally open (n/o) valve is provided which closes when the brake fluid flows into the bypass path upon opening of said n/c magnetic valve;
and wherein said pumping mechanism comprises:
(e) a pumping means
(f) a suction valve which is disposed between said pumping means and said reservoir, and which opens when the brake fluid pressure on the pumping means side is lower than the brake fluid pressure on the reservoir side;
(g) a discharge valve which is disposed between said pumping means and said main fluid path, and which opens when the brake fluid pressure on the pumping means side is higher than the brake fluid pressure on the main fluid path side; and
(h) an electromagnetic means for maintaining said suction valve in the position selected from the group consisting of an opened position and a closed position, and for stopping the discharging of the brake fluid from said discharge valve to said main fluid path.

According to such a construction of the device, the pumping mechanism is operated constantly regardless of the decrease, holding and increasing actions of the device, and during the decrease and holding phases of the operation, the bypass control valve element of the suction valve is magnetically attracted, which forces open the bypass path between the pump and the reservoir. The pump is operating, and therefore, the brake fluid is being pumped and discharged, but since the suction valve is open, the fluid simply oscillates between the pump and the reservoir, and does not return to the main fluid path. Or alternatively, instead of forcing open the suction valve of the bypass path, it is also possible to arrange so as to force a closure of the valve element of the suction valve in the bypass path by an electromagnetic means, so that the pump is not able to pump the brake fluid. On the other hand, during the pressure increase phase, the electromagnetic attraction of the valve element of the suction is relieved while keeping the normally closed magnetic valve closed. Under this condition, the suction valve allows only the flow from the reservoir, and the pumped fluid discharges into the main fluid path without returning to the reservoir.

The design of the brake fluid adjustment device of such a design allows pressure decrease, holding and increase actions by means of activating and deactivating the electromagnetic means. In all cases, the pump is always operated, there is no response delay caused by the inertial effects of the pump, thereby allowing delicate and timely control of the pressure adjustments to prevent wheel lock and the resulting skidding.

PREFERRED EMBODIMENT OF THE INVENTION

Figure 1:
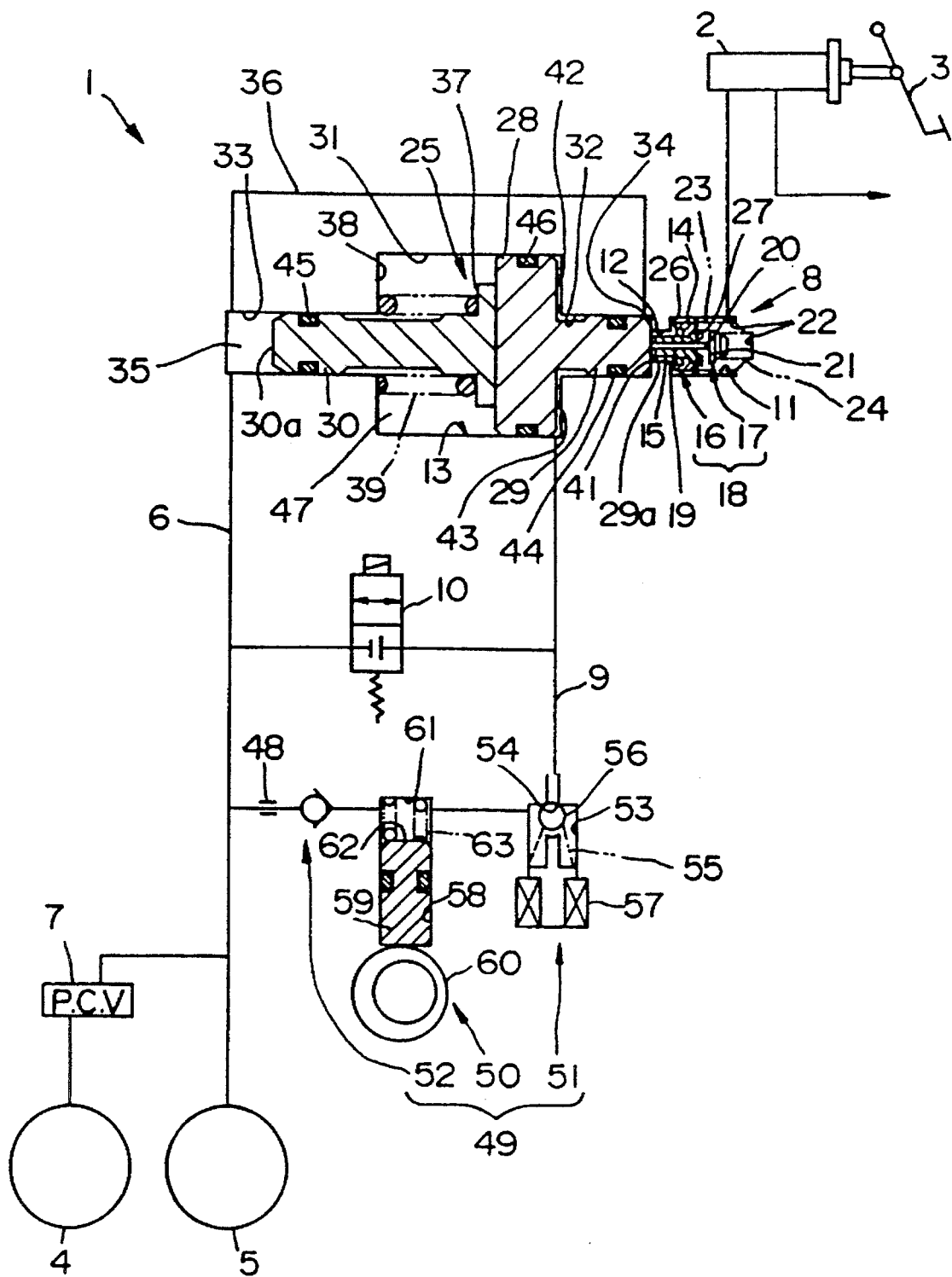
FIG. 1 is a schematic drawing to illustrate the construction of an embodiment of the brake fluid pressure adjustment device.
Figure 2:
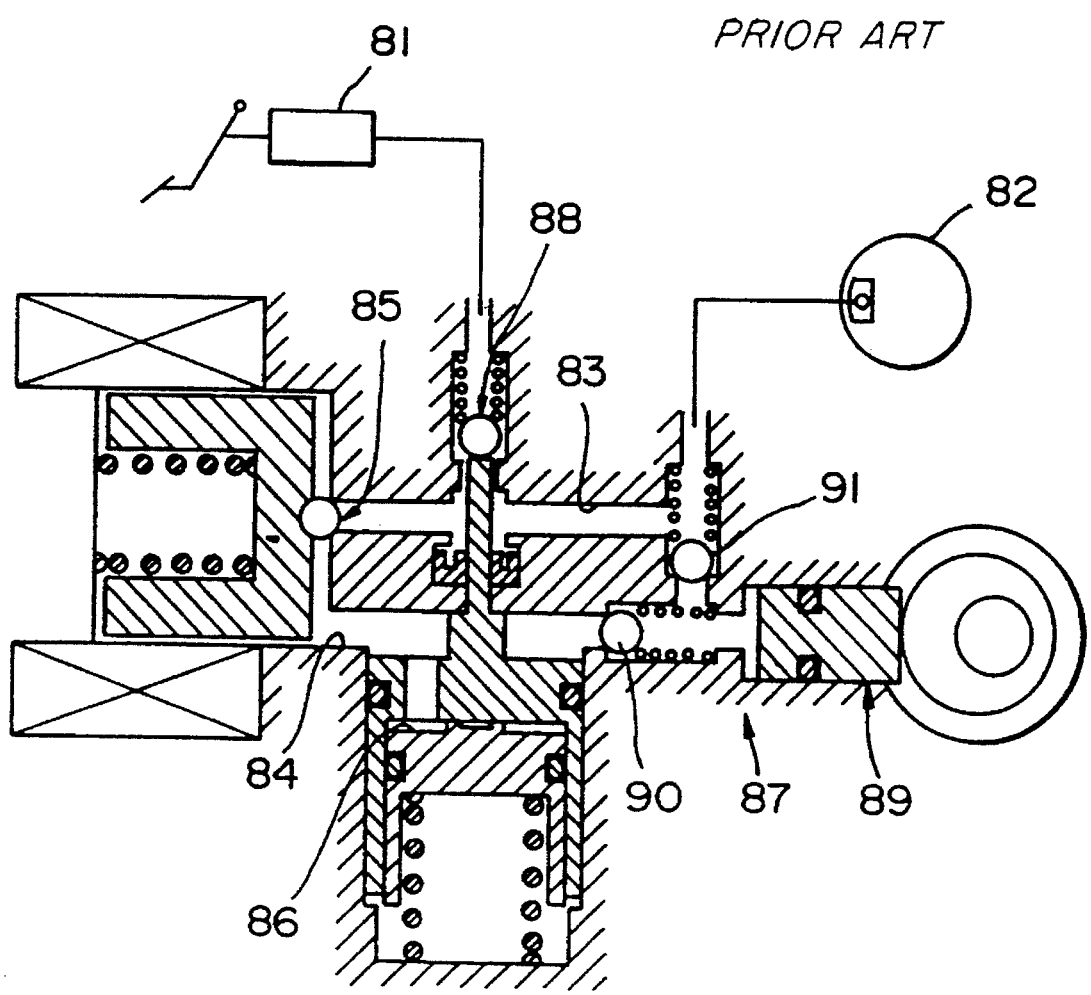
FIG. 2 is a schematic drawing showing the construction of the conventional brake fluid pressure adjustment device.

The details of an embodiment will be explained, with reference to FIG. 1. The embodiment utilizes two pressure adjustment systems, but because their construction is identical, explanations and figures are provided only for one of the two systems.

In the figure, the numeral 1 refers to a fluid pressure adjustment device for antiskid purposes, 2 is a master cylinder which is operatively connected to and acts in conjunction with a brake pedal 3 to generate the brake fluid pressure, 4, 5 are wheel cylinders which apply brakes to the wheels (not shown), 6 is the main fluid path to transmission of the fluid pressure which is disposed between the master cylinder 2 and the wheel cylinder 4, 5. There is a fluid pressure control valve 7 disposed on one wheel cylinder 4 of the wheel cylinders 4, 5.

The main fluid path 6 is provided with a n/o valve 8 which shuts off the main fluid path 6 on pressure reduction, and which is disposed on the master cylinder 2 side. On the side closer to the wheel cylinder 4, 5 of the n/o valve 8 in the main fluid path 6 (hereinafter referred to as downstream side), there is disposed a bypass path 9 which branches off from the main fluid path 6. There is disposed a n/c electromagnetic valve 10 in the bypass path 9, which opens on pressure reduction and which allows the fluid to flow from the main fluid path 6 to the bypass path 9.

The above mentioned n/o valve 8 operatively connects with or closes off the fluid passage path 11 from the connecting path 12 on the downstream side, and controls the fluid flow through the connecting path 12. This n/o valve 8 is provided with a main fluid path valve element 18 comprising: a primary valve element 16 which includes a cylinder section 14 of a larger diameter than the connecting path 12 and an axis section 15 of a smaller diameter than the connecting path 12; and a secondary valve element 17 which is disposed inside the primary valve element 16. The secondary valve element 17 comprises: a undersized shaft 20 which passes through the primary valve element 16 so as to create an inner path 19 which communicates between the cylinder 13 and the primary valve element 16; and a flange section 21 which is disposed on the shaft 20 on the side opposite to the cylinder 13. In each of the spaces between the end surface 22 of the fluid passage path 11 (opposite to the cylinder 13) and the primary valve element 16 as well as the secondary valve element 17 are disposed closure springs 23, 24 biased towards the cylinder 13 side. During the normal brake operation phase, the primary valve element 16 and the secondary valve element 17 are in contact with a piston 25 for controlling the n/o valve (which will be described later) disposed inside the cylinder 13, and are pressed by the piston 25 to be in the normally open condition. When the valves are to be closed, the piston 25 moves to operate the primary valve element 16 to contact the end surface 26 of the fluid passage path 11 to first close off the fluid flow into the cylinder 13 through the space between the external periphery of the primary valve element 16 and the fluid passage path 11 via the connecting path 12. Then, the flange section 21 of the secondary valve element 17 contacts the end surface 27 of the primary valve element 16 opposite to the connecting path 12, thereby shutting off the fluid flowing through the inner path 19 (disposed in between the primary valve element 16 and the secondary valve element 17) to the cylinder 13. Such a two staged action for shutting-off of the brake fluid is adopted so as to lessen hammering which accompanies opening and closing of the valves.

A cylindrical piston 25 for controlling n/o valves (hereinafter referred to simply as piston 25) is disposed inside the cylinder 13 so as to slide therein. The piston 25 is step shaped and comprises a large diameter section 28 in the middle thereof and two small diameter sections 29, 30 of equal diameter on both ends thereof. The small diameter section 29 disposed on the side of the main path valve element 18 keeps the main path valve element 18 normally open by pressing against the biasing force of the springs 23, 24.

The cylinder 13 engaging with the piston 25 is provided with a large diameter engaging cylinder 31, to engage with the larger diameter section 28, and two small diameter engaging cylinders 32, 33 to engage with the small diameter sections 29, 30, of appropriate shapes to fit with the piston 25. The small diameter engaging cylinder 32 on the side of the main path valve element 18 and the end surface 29a of the small diameter section 29 define the vacant space 34, which communicates with the connecting path 12, and together constitute a part of the main fluid path 6. The vacant space 35 defined by the small diameter engaging cylinder 33, disposed on the other side of the main path valve element 18, and by the end surface 30a of the small diameter section 30, also communicates with the vacant space 34 via the outer path 36, and together constitute a portion of the main fluid path 6.

There is an open position control spring 39 (termed opening spring 39) disposed in between the end surface 37, of the large diameter section 28 on the side opposite to the main fluid path valve element 18, and the opposing end surface 38 of the large diameter engaging cylinder 31. This spring 39 biases the piston 25 towards the main path valve element 18. The piston 25 when pressed by the spring 39 slide towards the main path valve element 18, and thereby forces the end surface 29a of the small diameter section 29 against the end surface 41 of the small diameter engaging cylinder 32 opposite to the end surface 29a. Under this condition, the small diameter section 29 presses the main path valve element 18 so as to separate the main path valve element 18 from the end surface 26 of the fluid passage path 11.

The reservoir 43 communicates with the bypass path 9, and is defined by the cylinder 13 and the end surface 42 on the side of the main path valve element 18 of the larger diameter section 28, and stores the brake fluid flowing from the bypass path 9 through the n/c electromagnetic valve 10. When the brake fluid flows into the reservoir 43, the piston 25 slides to separate away from the main path valve element 18 of the n/o valve 8. On the external periphery of the small diameter section 29, 30 and the large diameter section 28 of the piston 25, there are O-rings, 44, 45 and 46 to fit between the above mentioned periphery and the corresponding inner periphery of each of the small diameter engaging cylinders 32 33 and the large diameter engaging cylinder 31 of the cylinder 13. The seals are provided: between the vacant space 34 and the reservoir 43 by O-ring 44; between the insert section 47 and the vacant space 35 by O-ring 45; and between the insert section 47 containing the opening spring 39 and the reservoir 43 by O-ring 46.

On the downstream side of the reservoir 43 in the bypass path 9 is provided a pumping mechanism 49 whose discharge port 48 connects with the main fluid path 6. The pumping mechanism comprises the following main components: a reciprocating pump 50 which pumps and discharges the brake fluid; a suction valve 51 which allows a unidirectional fluid flow from the reservoir 43 to the reciprocating pump 50 only when the fluid pressure in the reciprocating pump 50 side is less than that-in the reservoir 43 side; and a discharge valve 52, which is disposed between the pump 50 and the discharge port 48, and which allows a unidirectional fluid flow from the reciprocating pump 50 to the discharge port 48 only when the fluid pressure in the pump 50 side is higher than that in the main-fluid path 6. The suction valve 51 comprises: a valve room 53 disposed in the bypass path 9; a valve element 56 which is disposed inside the valve room 53, and which provides a bypass path control by means of a biased suction-valve-control spring 55 (termed suction spring 55) so as to close the valve room opening 54, which is disposed on the reservoir 43 side of the bypass path 9; and an electromagnet 57 as an electromagnetic means which, upon excitation, causes the bypass path 9 to open and the reciprocating pump 50 to communicate with the reservoir 43, by magnetically attracting the valve element 56 for bypass control, thereby releasing the closure of the valve room opening 54 disposed on the reservoir 43 side of the bypass path 9. The reciprocating pump 50 comprises: an eccentric cam 60 which provides the reciprocating motion of the piston 59, inside the cylinder 58; and a pump control spring 63, which is disposed between the opposing cylinder end surface 61 and the piston end surface 62, and which is biased towards the eccentric cam 60 so as to let the piston 59 to be in constant contact with the cam 60.

The brake fluid pressure adjustment device 1 of such a construction operates in the following way. During the normal operation, i.e. the non-adjustment phase, the reciprocating pump 50 does not move, the n/c electromagnetic valve 10 is closed, and the main path valve element 18 is maintained in the normally open condition by means of the piston 25 biased by the spring force exerted by the opening spring 39, thereby permitting application of brakes to the wheel by means of the wheel cylinder 4, 5 via the main fluid path 6, by the fluid pressure delivered by the master cylinder 2. In this condition, the n/c em valve 10 is in the closed position, and since the discharge valve 52 blocks the flow of brake fluid from the main fluid path 6 to the reciprocating pump 50, the fluid pressure acts only on the end surfaces 29a, 30a of the small diameter section 29, 30, and does not act on the end face 42 of the large diameter section 28 of the piston 25 via the bypass path 9.

When it is necessary to avoid a wheel lock at the time of braking, the system of the present invention is activated by means of a suitable sensing means such as sensors provided on the wheels (not shown). When the fluid pressure in the wheel cylinder 4, 5 is increased due to braking during normal operation as described above and it becomes necessary to reduce the fluid pressure in the wheel cylinder 4, 5 in order to attenuate the braking force, the n/c electromagnetic valve 10 in the bypass path 9 is opened, and the fluid in the main fluid path 6 is flowed into the reservoir 43 through the bypass path 9, and the fluid flows into the reservoir 43, and acts on the end surface 42 of the large diameter section 28 of the piston 25 to generate a pressure differential, and causes the n/o valve control piston 25 to slide in the opposite direction to the main path valve element 18 against the biasing force of the spring 39. Accordingly, the valve element 18 biased by the springs 23, 24 cuts off the flow of fluid from the master cylinder 2 to the main fluid path 6 and the brake fluid in the wheel cylinders 4, 5 is released from the wheel cylinder 4, 5 by the action of the wheel cylinder 4, 5 itself, and flows into the reservoir 43 via the main fluid path 6, thereby reducing the fluid pressure to the wheel cylinder 4, 5 and preventing the wheel lock. At the same time, the eccentric cam 60 is activated so as to operate the reciprocating pump 50 of the pumping mechanism 49 which is disposed in the bypass path 9, and by attracting the bypass control valve element 56 of the suction valve 51 by means of the excitation provided to the electromagnet 57, thereby forcing to open the bypass path 9 between the reciprocating pump 50 and the reservoir 43. In this condition, the reciprocating pump 50 is operative and continues to repeat the cycle of pumping and discharging of the brake fluid, however, because the suction valve 51 is forcibly opened, and the valve-opening force on the discharge valve 52 and the biasing force on the opening spring 39 are adjusted appropriately so as to let the brake fluid flow into the reservoir 43 without opening the discharge valve 52 when the pump 50 withdraws or discharges the brake fluid flowing into the bypass path 9 via em n/c valve 10, the fluid flows back and forth between the pump 50 and the reservoir 43, via the bypass 9, and does not return to the wheel cylinders 4, 5 via the main path 6, thereby preventing the increase in the fluid pressure in the wheel cylinders 4, 5. Under the above conditions, the force that the wheel cylinder 4, 5 applies to the brake fluid is much larger than the force that the n/c valve control piston 25 applies to the brake fluid. For this reason, even if the n/c electro-magnetic valve 10 is open, the brake fluid which is released from the reciprocating pump 50 via the open suction valve 51 does not pass through the n/c electromagnetic valve 10 and flow into the wheel cylinder 4, 5, but is instead discharged into the reservoir 43. Such actions of the brake fluid means that the fluid volume in the reservoir 43 fluctuates, however, there is no effect of such fluctuations on the pressure reduction action of the brake fluid in the wheel cylinders 4, 5, because the small diameter sections 29, 30 of the piston 25 form a part of the main fluid path 6, and because both end surfaces of the sections 29a, 30a are under an equal fluid pressure.

On the other hand, when it is necessary to increase the braking force form the state wherein the brake fluid pressure in the wheel cylinder 4, 5 is reduced as described above, by increasing the brake fluid pressure in the wheel cylinder 4, 5, the n/c electro-magnetic valve 10 in the bypass path 9 is closed, and the magnet 57 is turned off, thereby deactivating the attraction of the bypass control valve element 56 of the suction valve 51. Under this condition, the suction valve 51 reverts to the original function of allowing only the flow from the reservoir 43, to the reciprocating pump 50 and therefore, the brake fluid drawn from the reservoir 43 and discharged by the reciprocating pump 50 does not return to the reservoir 43, but returns to the main fluid path 6 via the discharge valve 52, thereby increasing the fluid pressure in the wheel cylinder 4, 5.

During such a pressure increase phase of the operation, an unnecessary increase in the fluid pressure is prevented, as in the case of the pressure decrease phase, by forcing open the bypass path 9 between the reciprocating pump 50 and the reservoir 43, by activating the magnet 57 and thus the bypass control valve element 56 of the suction valve 51, as needed, so as to let the fluid discharged from the operating pump 50 flow back and forth between the pump 50 and the reservoir 43, and not letting the fluid go back into the main fluid path 6.

By appropriately repeating the above described fluid pressure decrease, holding, and increase actions, and ultimately when the fluid from the reservoir 43 is completely discharged to the main fluid path 6, due to the above-described pressure increase phase, the n/o valve control piston 25 slides by means of the opening spring 39, thereby separating the end surface 26 of the fluid passage path 11 from the main path valve element 18 by pressing on the main path valve element 18, and thereby connecting the master cylinder 2 with the wheel cylinders 4, 5, and returning the brake operation to normal.

As explained above, the brake fluid pressure adjustment device 1 provides the fluid pressure decrease, holding and increase actions, by means of activating and deactivating of the electromagnet 57, an electromagnetic means, and the pump 50 does not need to be turned off and is continually operated during all the action phases, thereby avoiding response delays caused by the inertial effects of the pump 50, and thereby providing a quick and timely antiskid response.

Further, the suction valve 51 functions as the originally intended one-way valve when not being activated by the magnet 57, at which time the n/c electro-magnetic valve 10, in the bypass path 9, is closed so as to increase the fluid pressure. Therefore, it is not subject to the fluid pressure of the main fluid path 6, and therefore the biasing force of the suction spring 55 of the suction valve 51 can be made low. As a consequence, the power of the electromagnet 57, which bucks the force of the suction spring 55 can also be lowered, thereby the whole structure, including the magnet 57 can be made simple and compact.

It is not necessary to stop discharging of the fluid from the discharge valve 52, as in the above embodiment, by forcing open the bypass path 9, between the reciprocating pump 50 and the reservoir 43, by letting the magnet 57 act on the suction valve 51. An alternative approach may be to close the bypass control valve element 56 of the suction valve 51 by means such as an electromagnet 57 (for example, use the movable plunger of the electromagnet 57 to press on the valve element 56 in the direction of closure) to prevent the pump 50 to pump the fluid to stop the discharge of fluid from the discharge valve 52. Such an arrangement may be preferred in the case of rotary pumps. Further, it is only necessary that the above vacant space 35 communicates with the main fluid path 6, and need not be a part of the main fluid path 6.

What is claimed is:

1. A brake fluid pressure adjustment device comprising:

a main fluid path which communicates a wheel cylinder to a master cylinder, and a bypass path branching from said main fluid path;

said bypass being provided with:

(a) a normally closed magnetic valve which opens when the brake fluid pressure in said wheel cylinder is to be forcibly lowered, and thereby permitting the brake fluid to flow into said bypass path;

(b) a reservoir for storing the brake fluid flowing through said normally closed magnetic valve; and (c) a pumping mechanism which returns the brake fluid in said reservoir back to said main fluid path;

and between the bypass path and the master cylinder of the main fluid path, is provided, (d) a normally open valve which closes when the brake fluid flows into the bypass path upon opening of said normally closed magnetic valve;

and wherein said pumping mechanism comprises:

(e) a pumping means for withdrawing and discharging the brake fluid when the brake fluid pressure in said wheel cylinder is to be forcibly reduced and when the brake fluid in said reservoir is returning back to said main fluid path;

(f) a suction valve which is disposed between said pumping means and said reservoir and which has a bypass path control valve element and a seat which close off the bypass path by coming into mutual contact and open the bypass path by mutually separating, opening when the brake fluid pressure on the pumping means side is lower than the brake fluid pressure on the reservoir side by a set amount as a result of the separation of the bypass path control valve element and the seat, and closing when the brake fluid pressure on the pumping means side is not lower than the brake fluid pressure on the reservoir side by said set amount as a result of mutual contact between the bypass control valve element and the seat;

(g) a discharge valve which is disposed between said pumping means and said main fluid path, which opens when the brake fluid pressure on the pumping means side is higher than the brake fluid pressure on the main fluid path side by a set amount, and closes when the brake fluid pressure on the pumping means side is not higher than the brake fluid pressure on the main fluid path side by said set amount; and (h) an electromagnetic means for forcibly maintaining said suction valve in an opened position which supports a state wherein said bypass path control valve element and said seat are separated when the brake fluid pressure in said wheel cylinder is to be forcibly reduced, thereby stopping the discharging of the brake fluid from said discharge valve to said main fluid path, and releasing said suction valve from the opened position when the brake fluid pressure in said wheel cylinder is to be forcibly increased, thereby allowing the discharging of the brake fluid from said discharge valve to said main fluid path.

2. A brake fluid pressure adjustment device as claimed in claim 1, wherein said pumping means is a reciprocating pump.

3. A brake fluid pressure adjustment device as claimed in 2, wherein said suction valve comprises:

a suction valve control spring means for biasing said bypass path control valve element towards closing the flow in said bypass path;

and in which said electromagnetic means operates to attract said bypass path control valve element so as to permit a flow of fluid in said bypass path against the first of said suction valve control spring means.

4. A brake fluid pressure adjustment device as claimed in 1 wherein said suction valve comprises:

a suction valve control spring means for biasing said bypass path control valve element towards closing the flow in said bypass path;

and in which said electromagnetic means operates to attract said bypass path control valve element so as to permit a flow of fluid in said bypass path against the first of said suction valve control spring means.

5. A brake fluid pressure adjustment device comprising:

a main fluid path which communicates a wheel cylinder to a master cylinder, and a bypass path branching from said main fluid path;

said bypass path being provided with:

(a) a normally closed magnetic valve which opens when the brake fluid pressure in said wheel cylinder is to be forcibly lowered, and thereby permitting the brake fluid to flow into said bypass path:

(b) a reservoir for storing the brake fluid flowing through said normally closed magnetic valve; and (c) a pumping mechanism which returns the brake fluid in said reservoir back to said main fluid path;

and between the bypass path and the master cylinder of the main fluid path, is provided, (d) a normally open valve which closes when the brake fluid flows into the bypass path upon opening of said normally closed magnetic valve;

and wherein said pumping mechanism comprises:

(e) a pumping means for withdrawing and discharging the brake fluid when the brake fluid pressure in said wheel cylinder is to be forcibly lowered and when the brake fluid in said reservoir is returning back to said main fluid path;

(f) a suction valve which is disposed between said pumping means and said reservoir and which has a bypass path control valve element and a seat which close off the bypass path by coming into mutual contact and open the bypass by mutually separating, opening when the brake fluid pressure on the pumping means side is lower than the brake fluid pressure on the reservoir side by a set amount as a result of the separation of the bypass path control valve element and the seat, and closing when the brake fluid pressure on the pumping means side is not lower than the brake fluid pressure on the reservoir side by said set amount as a result of mutual contact between the bypass control valve element and the seat;

(g) a discharge valve which is disposed between said pumping means and said main fluid path, which opens when the brake fluid pressure on the pumping means side is higher than the brake fluid pressure on the main fluid path side by a set amount, and closes when the brake fluid pressure on the pumping means side is not higher than the brake fluid pressure on the main fluid path side by said set amount; and (h) an electromagnetic means for forcibly maintaining said suction valve in a position selected from the group consisting of an opened position which supports a state wherein said bypass path control valve element and said seat are separated, and a closed position which supports a state wherein said bypass path control valve element and said seat are in mutual contact, thereby stopping the discharge of the brake fluid from said discharge valve to said main fluid path, and releasing said suction valve from said position when the brake fluid pressure in said wheel cylinder is to be forcibly increased;

wherein said normally open valve comprises:

(i) a main path valve element which closes off said main fluid path;

(j) a closure position control spring for biasing said main path valve element in the direction of closing off said main fluid path;

(k) a normally open valve control piston for controlling the motion of the valve element so as to control opening and closing said main fluid path;

(l) an open position control spring which biases said normally open valve control piston;

wherein said normally open valve control piston is provided with a middle section of a large diameter section and two small diameter sections of smaller diameter than said large diameter section disposed on both ends of said large diameter section, and during the normal braking operation, said normally open valve control piston is pressed by said open position control spring so as to press said main path valve element in the direction to open the main fluid path, with one section of said two small diameter sections, and when said normally closed magnetic valve is activated, under antiskid operation, the fluid flows into the bypass path, and the brake fluid pressure causes said normally open valve control piston to slide against the biasing force of said open position control spring, by the action of said brake pressure acting at an end surface of said large diameter section of the main path valve element side, and said main path valve element closes the main fluid path, thus exposing both end surfaces of said small diameter sections to the fluid pressure of the main fluid path.

* * * * *